United States Patent [19]

Kim et al.

[11] Patent Number: 4,998,171

[45] Date of Patent: Mar. 5, 1991

[54] AUTOMATIC SHIFT CIRCUIT FOR A SUB-PICTURE SCREEN FOR PICTURE-IN-PICTURE FEATURE

[75] Inventors: Yong-san Kim, Seoul; Han-Kyu Lee, Suwon, both of Rep. of Korea

[73] Assignee: SamSung Electronics Co., Ltd., Suweon City, Rep. of Korea

[21] Appl. No.: 398,926

[22] Filed: Aug. 28, 1989

[30] Foreign Application Priority Data

Jul. 5, 1988 [KR] Rep. of Korea .................. 88-10908

[51] Int. Cl.[5] ...................... H04N 9/74; H04N 5/262; H04N 5/272
[52] U.S. Cl. ....................................... 358/183; 358/22
[58] Field of Search ................. 358/183, 22, 182, 181

[56] References Cited

U.S. PATENT DOCUMENTS 4,623,915 11/1986 Bogler ................................ 358/183
4,774,582 9/1988 Hakamada ......................... 358/183

FOREIGN PATENT DOCUMENTS 0037778 4/1981 Japan ................................. 358/183

Primary Examiner—Howard W. Britton
Assistant Examiner—Michael H. Lee
Attorney, Agent, or Firm—Robert E. Bushnell

[57] ABSTRACT

An automatic-shift circuit for a sub-picture screen for PIP feature is disclosed. The circuit includes;
a brightness signal separator device for separating only the brightness signal from the composite video signal for the main picture screen; a brightness level comparison device for selecting the character brightness level and the width thereof from the separated brightness signals; and a identical position comparison device for determining whether the character brightness width is detected at the identical position. The circuit also includes a device for setting the vertical and the horizontal timing; a counter for counting the field number where character brightness width is detected at the identical position and for generating the automatic shifting signal if the field number counted is beyond the predetermined value; and a microcomputer for controlling the PIP processing unit so as to shift the sub-picture screen upon receipt of the automatic shifting signal.

This invention enables the sub-picture screen to automatically shift to another pre-specified area according to the presence of character information on the main picture screen overlapping with the sub-picture screen.

12 Claims, 3 Drawing Sheets

AUTOMATIC SHIFT CIRCUIT FOR A SUB-PICTURE SCREEN FOR PICTURE-IN-PICTURE FEATURE

FIELD OF THE INVENTION

This invention relates to a video signal processing circuit, especially in the display of a reduced sub-picture screen on the main picture screen, which automatically shifts the sub-picture screen in accordance with the character display on the main picture screen.

Recently, because of the progress of digital processing techniques for video signals, a M-PIP (Multiple Picture-In-Picture) technique which simultaneously displays at least one reduced sub-picture screen on the main picture screen has been proposed.

Generally, in the picture screen layout for the PIP features, the sub-picture screen area is assigned to the lower-left or lower-right corner of the main picture screen. On the other hand, character information, such as a news flash, is displayed on the lower part of the main picture screen. Thus, in the case where the characters are displayed on the lower part of the main picture screen as mentioned above, those characters in the area overlapped by the sub-picture screen are not shown. Thus, in earlier systems, the systems are designed so that the TV viewer can shift the sub-picture screen to some pre-specified area by pressing the SHIFT-key if characters are shown on the lower part of the main picture screen. This is very inconvenient, since the TV viewer must shift the sub-picture screen to another, pre-specfied, area by manual operation whenever character information appears, and then return the sub-picture screen to the original position when the character information has disappeared.

Therefore, it is an object of the present invention to provide an automatic-shift circuit for a sub-picture screen for the PIP feature, capable of automatically shifting the sub-picture screen to another pre-specified area according to the presence of character information on the main picture screen over-lapping with the sub-picture screen.

It is another object of the present invention to provide an automatic-shift circuit for sub-picture screen for the PIP feature that makes use of the PIP feature more conveniently.

SUMMARY OF THE INVENTION

In order to achieve the objects, the present invention includes a brightness signal separation device which separates out only the brightness signal from the composite video signal to the main picture screen. A brightness level comparison device is connected to the said brightness signal separation device. This brightness level comparison device is used to detect the brightness width that successively exceeds the reference brightness level, which is specified in advance, in order to detect the presence of characters in the separated brightness signal, by means of the prescribed width. An identical position comparison device is conncetcd to the said brightness level comparison device. This identical position comparison device compares the previously detected brightness width with the next detected brightness width, in order to generate a SET signal if in the same position, or to generate a RESET signal if in a different position. A timing setting device is connected to this identical position comparison device. This timing setting device is used to set the vertical and horizontal timings of the sub-picture screen from the vertical and horizontal sync signals of the main picture screen, and to set the vertical and horizontal timings of the character area from the SET and RESET signals of the identical position comparison device. A counter means is connected to this timing setting device. This count is used to count the number of fields in which the vertical and horizontal timings of the character area of the timing setting device are set, and to generate the automatic-shift signal when the count exceeds the prescribed amount. The output of the counter device is connected to a microcomputer. The microcomputer generates control signals from the automatic-shift signal, which are used to shift the specified position of the sub-picture screen on the main picture screen to another prescribed position, and supplies the control signals to a PIP processing unit.

DETAILED DESCRIPTION OF THE INVENTION

Figure 1:
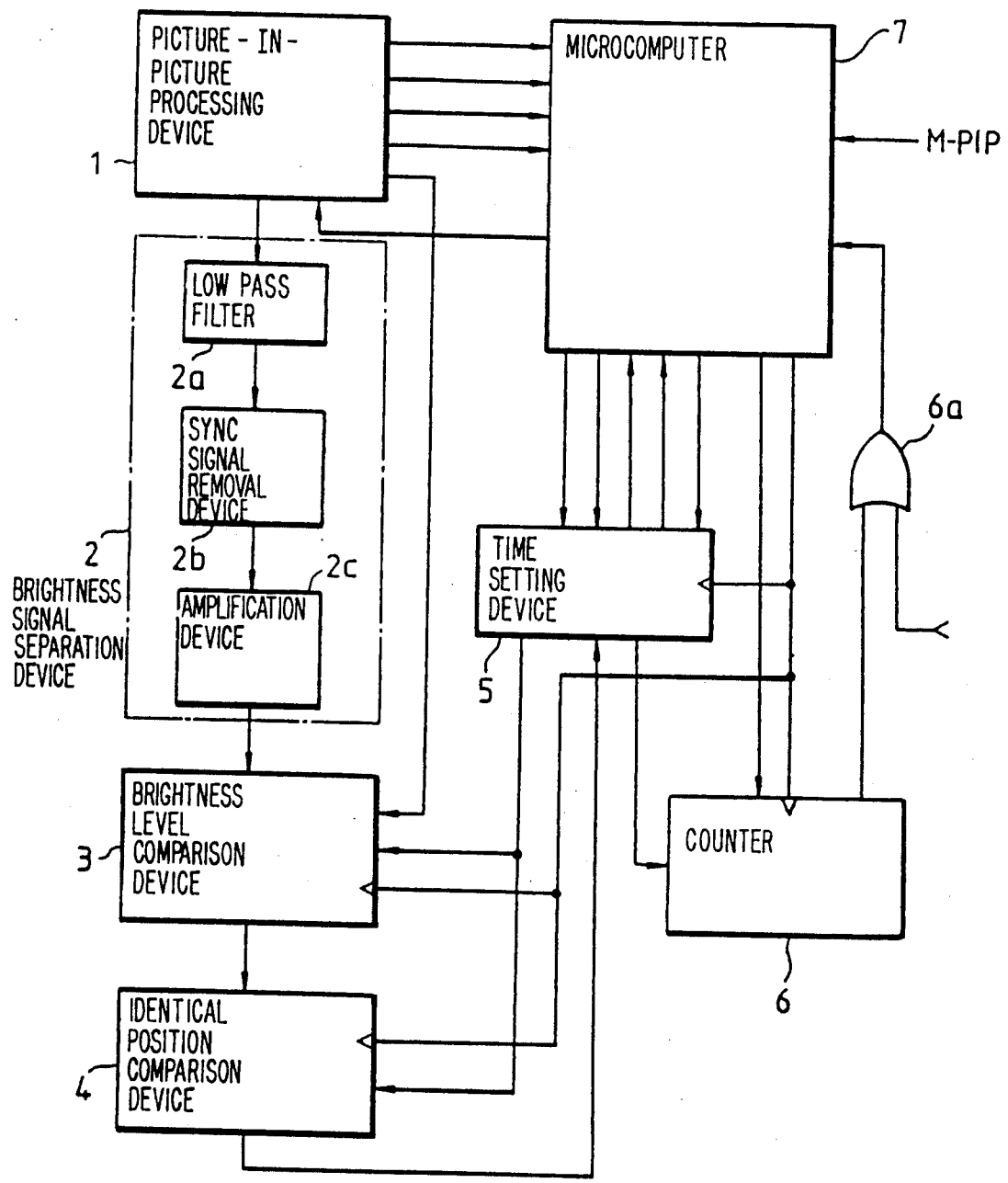
FIG. 1 is a block diagram of an automatic-shift circuit for a sub-picture screen for the PIP feature, according to the present invention.

FIG. 1 is a circuit diagram of the automatic-shift circuit of a sub-picture screen for the PIP feature in accordance with the present invention. In FIG. 1, the composite video signal of the main picture screen supplied by the PIP processing device 1 is supplied to the brightness signal separation device 2. At this brightness signal separation device 2, only the low frequency component of the supplied composite video signal is passed through a low pass filter 2a. This low frequency signal component contains the sync signal, hence the signal is supplied to a sync signal removal device 2b to eliminate the sync signal. The brightness signal, from which the sync signal has been eliminated by this sync signal removal device is amplified by an amplification device 2c and is output.

The brightness level comparison device 3 receives this amplified brightness signal. This brightness level comparison device checks the level of the received brightness signal, to determine whether the level is greater than the reference brightness level supplied by the PIP processing device 1 for example, a brightness level of 98 IRE. While the above comparison proceeds, any brightness width consecutively greater than 98 IRE that satisfies a prescribed width, e.g., a condition of 1/100 H < consecutive brightness width <1/50 H, is detected and is output. This is used to detect any character information since, in general, the brightness level of character information, such as a news flash is greater than 98 IRE, and its brightness width ranges from 1/100 H to 1/50 H per a horizontal line.

The identical position comparison device 4 receives the output of the brightness level comparison device 3. This identical position comparison device 4 compares the previously detected brightness width with the next detected brightness width, and generates a SET signal if occupies the same position, or a RESET signal if occupying a different position. For example, if the number of dots for the N-th detected brightness width is N, and the number of dots for the (N+1)−th detected brightness width, (N+1), satisfies the condition of 0.8(N)<(N+1)<1.2(N), it is recognized as being in the same horizontal position. For recognition of the vertical position, it recognizes the same position in the same way as for the horizontal position.

The timing setting device 5 sets the vertical and horizontal timings of the sub-picture screen, using the vertical and horizontal sync signals of the main picture screen, and supplies the established timing signal to the brightness level comparison device 3 and the identical position comparison device 4. Moreover, the timing setting device 5 also receives the output signal of the identical position comparison device 4, sets the vertical and horizontal timings for the character signal which is located within the sub-picture screen area of the main picture screen, and supplies the timing signals to the microcomputer 7, described later. It also outputs the vetical sync signal for the field where the vertical and horizontal timings for the character signal have been established.

The counter 6 counts the vertical sync signals outputted from the timing setting device 5, and generates an automatic shift signal when the count exceeds the prescribed amount. Generally, character information is displayed on the picture screen for about five seconds. Therefore, it continues to detect the character signal for 2.5 sec and, then, if the character signal is located in an area where the signal overlaps the sub-picture screen area, it counts the vertical sync signals in order to shift the initially specified sub-picture screen area to the next, alternately specified sub-picture screen area. When it counts to 150, it generates the automatic-shift signal. Therefore the character signal appears for the remaining 2.5 seconds on the main picture screen where the sub-picture screen was overlapped.

The microcomputer 7 receives the automatic shift signal and manual-shift signal via an OR gate 6a. Thus, when the shift signal is supplied, the microcomputer 7 provides the PIP processing device 1 with the sub-picture screen shift control signal. The microcomputer 7 supplies clock signals to the brightness level comparison device 3, identical position comparison device 4, and counter 6 so as to synchronize their operations. Moreover, when the microcomputer 7 receives the shift signal, it resets the counter 6 to initialize.

Figure 2:
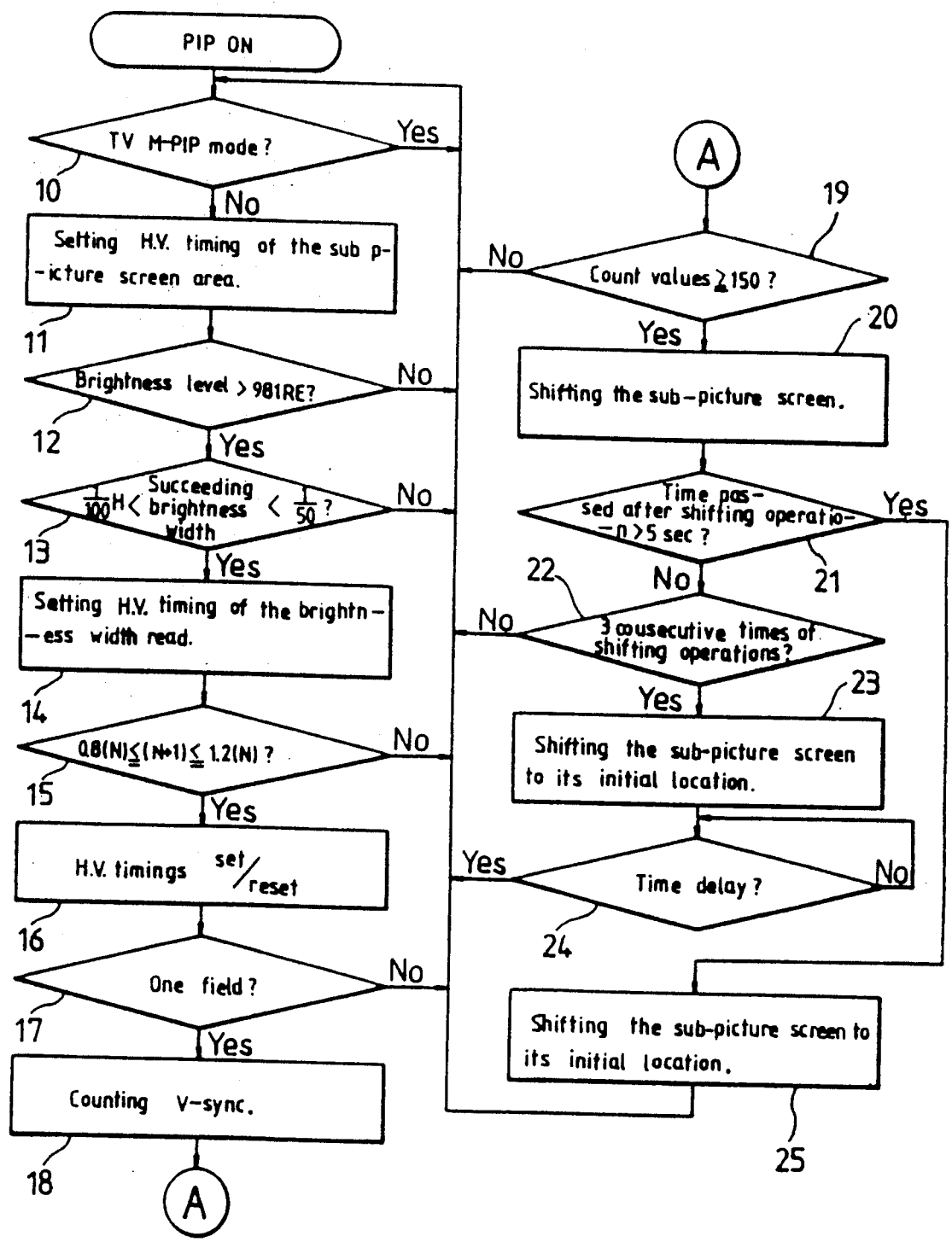
FIG. 2 is a flow chart explaining the operation of the automatic-shift circuit for a sub-picture screen for the PIP feature, according to the present invention.

The following is a description of the operation and the effect of the present invention with reference to FIG. 2.

In FIG. 2, the microcomputer 7 checks whether the TV set is in the M-PIP mode when the PIP feature is turned on (10th step), if it is not in the M-PIP mode, then sets accurate timings for the specified sub-picture screen area, using the vertical sync (VS) signal and the horizontal sync (HS) signal (11th step).

On the other hand, the low pass filter 2a of the brightness signal separation means 2, separates the low frequency signal from the composite video signal for the main picture screen; the sync signals are removed by the sync signal removal device 2b, which includes of a diode, so that only the pure brightness signal is amplified by the amplification device 2c and is output. The brightness level comparison device 3 tests whether the level-amplified brightness signal is greater than 98 IRE, when the presence of character information can be detected (12th step).

Moreover, at the 12th step, if the brightness signal is greater than 98 IRE, whether the succeeding brightness width is in the range from 1/100 H to 1/50 H is then checked (13th step). Here an accurate reference point is clamped, so that the reference of the brightness level agrees exactly with the pedestal level which is outputted from the PIP processing device 1.

At the 13th step, if the brightness width is between 1/100 H and 1/50 H, the microcomputer 7 determines the brightness width and immediately sets the horizontal and vertical timings (14th step). At the 14th step, if the horizontal and vertical positions are from 0.8(N) timing to 1.2 (N) timing, the horizontal and vertical timings are set, but otherwise, the program returns to the 10th step (15th step). Thus, a potential character output timing will be fed back to the timing setting device 5, and this will change the timing for the primary sub-picture screen area, to compress the established timing. These procedures continuously set/reset the horizontal and vertical timings until one field has been completed (16th step).

Figure 3:
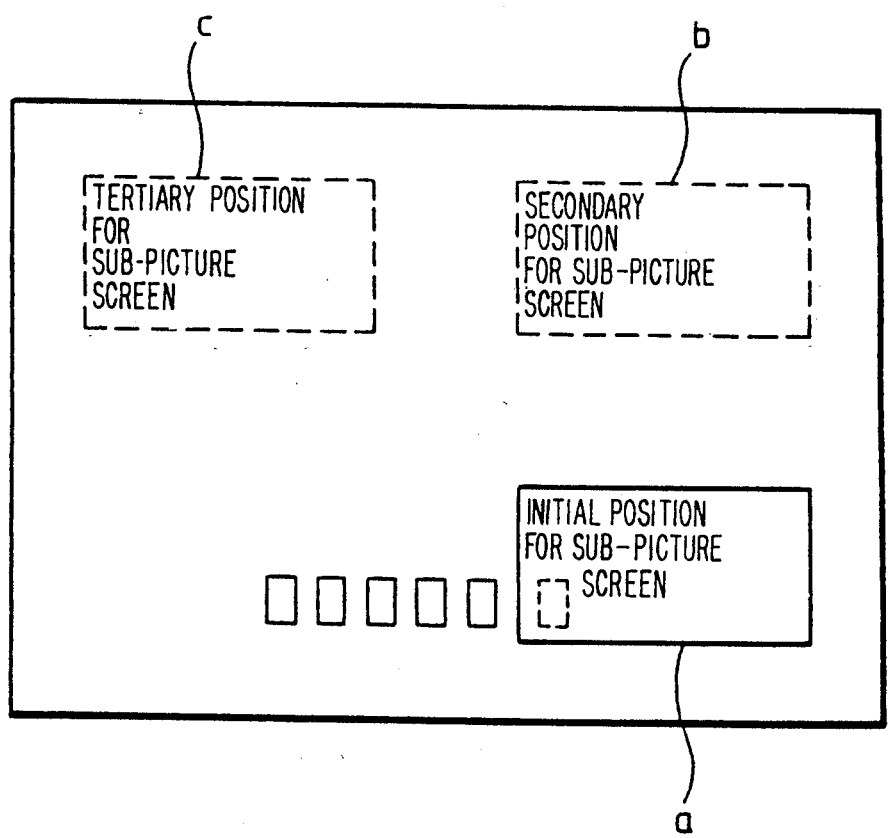
FIG. 3 is a screen layout explaining the operation of the present invention.

After completing the primary field (17th step), the counter 6 counts one vertical sync signal (18th step). At the 18th step, if the count value exceeds the specified amount (19th step), the microcomputer 7 automatically shifts the sub-picture screen to the secondary specified area (area b of FIG. 3) (20th step). At the 20th step, if 5 seconds do not elapse after the sub-picture screen shifting (21st step), a check is made as to whether shifts occur 3 consecutive times (22nd step). At the 22nd step if shifts do not occur 3 consecutive times, it returns to the 10th step; but if shifts do occur 3 consecutive times, it shifts the sub-picture screen area to its initial position (area a of FIG. 3) (23rd step). At the 23rd step, after delaying for a prescribed time interval (24th step), it will return to the 10th step.

Moreover, at the 21st step, if 5 seconds elapse after the shift, it shifts to return the sub-picture screen from the secondary area to the primary area (25th step).

At the 21st to 24th steps, in case characters are also generated in the specific area shifted to, the program shifts the sub-picture screen area to a third area (area c in FIG. 3) after completing the procedures. If characters are also generated in this third area, shifting will be prevented for a specified time interval to maintain the initial area. If the specified time interval does not elapse, the program continues to search the specified position, but if the specified time interval does elapse, the program shifts the sub-picture screen to its initial location.

As described in the above, the automatic shift circuit of the present invention is characterized by its capability to conveniently provide character information on the picture screen to a TV viewer, by detecting the brightness signal level of the area overlapping the specified sub-picture screen area from the video signal for the main picture screen, ascertaining that the level width can be recognized as a character signal and has a constant position, and by then automatically shifting the sub-picture screen.

What is claimed is:

1. An automatic-shift circuit for a sub-picture screen for a Picture-In-Picture feature, comprising:
   brightness signal separation means for separating a brightness signal from a composite video signal for a main picture screen;
   brightness level comparison means connected to said brightness signal separation means, for detecting character brightness level and width from the repeated brightness signals to detect the presence of characters from said separated brightness signal;

identical position comparison means connected to said brightness level comparison means for comparing a previously detected brightness width with a next detected brightness width in order to generate a SET signal if the next detected brightness width occupies the same position as the previously detected brightness width, or a RESET signal if the next detected brightness width occupies a position different from the previously detected brightness width;

timing setting means for setting vertical and horizontal timings of the sub-picture screen from vertical and horizontal sync signals of the main picture screen, and setting vertical and horizontal timings of character area based on the SET and RESET signals of said identical position comparison means;

counting means for counting a number of fields having the vertical and horizontal timings of the character area of said timing setting means set, and for generating an automatic-shift signal when the count exceeds a prescribed value; and a microcomputer for generating control signals from said automatic-shift signal, and for shifting the primary specified position of the sub-picture screen within the main picture screen to a prescribed secondary or tertiary position.

2. A device as claimed in claim 1, further comprising:

a Picture-In-Picture processing unit, coupled to receive a control signal from said microcomputer, for providing the composite video signal of the main picture screen to said brightness signal separation means; and an OR gate, coupled to receive automatic and manual shift signals, for providing the automatic and manual shift signals to said microcomputer.

3. A device as claimed in claim 2, wherein said brightness signal separation means comprises:

a low pass filter, coupled to receive the composite video signal from said Picture-In-Picture processing unit, for removing high frequency components of the composite video signal;

synch signal removal means coupled to receive the filtered composite video signal from said low pass filter for removing a synch signal from said filtered composite video signal producing a brightness signal; and amplification means, coupled to receive the brightness signal from said synch signal removal means, for amplifying the brightness signal.

4. An automatic-shift circuit for a sub-picture screen for a Picture-In-Picture feature, comprising:

brightness signal separation means, coupled to receive a composite video signal, for separating a brightness signal from a composite video signal for a main picture screen;

brightness level comparison means, coupled to receive an amplified brightness signal from said brightness signal separation means, for detecting character brightness level and width from the repeated brightness signals to detect the presence of characters from said separated brightness signal;

identical position comparison means coupled to receive a signal representing brightness width of the brightness signal from said brightness level comparison means, for comparing the previously detected brightness width with a next detected brightness width in order to generate a SET signal if the next detected brightness width occupies the same position as the previously detected brightness width or a RESET signal if the next detected brightness width occupies a position different from the previously detected brightness width;

timing setting means for setting vertical and horizontal timings of the sub-picture screen from vertical and horizontal sync signals of the main picture screeen based on signals received from said identical position comparison means and setting vertical and horizontal settings of character area based on the SET and RESET signals of said identical position comparison means;

counting means for counting a number of fields having the vertical and horizontal timings of the character area of the said timing setting means set, and for generating an automatic-shift signal when the count exceeds a prescribed value; and a microcomputer for generating control signals from said automatic-shift signal, and for shifting the primary specified position of the sub-picture screen within the main picture screen to a prescribed secondary or tertiary position, and providing a sub-picture screen shift control signal for shifting the sub picture screen to the secondary or tertiary position.

5. A device as claimed in claim 4, further comprising:

a Picture-In-Picture processing unit, coupled to receive control signals from said microcomputer, for providing the composite video signal of the main picture screen to said brightness signal separation means; and an OR gate, coupled to receive automatic and manual shift signals, for providing the automatic and manual shift signals to said microcomputer.

6. A device as claimed in claim 5, wherein said brightness signal separation means comprises:

a low pass filter, coupled to receive the composite video signal from said Picture-In-Picture processing unit, for removing high frequency components of the composite video signal;

synch signal removal means coupled to receive the filtered composite video signal from said low pass filter for removing a synch signal from said filtered composite video signal producing a brightness signal; and amplification means coupled to receive the brightness signal from said synch signal removal means for amplifying the brilghtness signal.

7. An automatic-shift circuit for a sub-picture screen for Picture-In-Picture feature, comprising:

a Picture-In-Picture processing unit;

brightness signal separation means, coupled to receive a composite video signal from said Picture-In-Picture processing unit, for separating a brightness signal from the composite video signal for a main picture screen, comprising:

a low filter for removing high frequency components of the composite video signal;

synch signal removal means coupled to receive the filtered composite video signal from said low pass filter for removing a synch signal from said filtered composite video signal producing a brightness signal; and amplification means coupled to receive the brightness signal from said synch signal removal means for amplifying the brightness signal;

brightness level comparison means, coupled to receive an amplified brightness signal from said brightness signal separation means, for detecting character brightness level and width from the repeated brightness signals to detect the presence of characters from said separated brightness signal;

identical position comparison means coupled to receive a signal representing the brightness width of the brightness signal from said brightness level comparison means, for comparing the previously detected brightness width with a next detected brightness width in order to generate a SET signal if the next detected brightness width occupies the same positions the previously detected brightness width or a RESET signal if the next detected brightness width occupies a position different from the previously detected brightness width;

timing setting means for setting vertical and horizontal timings of the sub-picture screen from vertical and horizontal sync signals of the main picture screen based on signals received from said identical position comparison means and for setting vertical and horizontal timings of character area based on the SET and RESET signals of said identical position comparison means;

counting means for counting fields having the vertical and horizontal timings of the character area of the said timing setting means set, and for generating an automatic-shift signal when the count exceeds a prescribed value;

a microcomputer for generating control signals from said automatic-shift signal, and for shifting the primary specified position of the sub-picture screen within the main picture screen to a prescribed secondary or tertiary position, and providing a sub-picture screen shift control signal to a Picture-In-Picture processing unit for shifting the sub picture screen to the secondary or tertiary position; and an OR gate, coupled to receive automatic and manual shift signals, for providing said automatic and manual shift signals to said microcomputer.

8. An automatic-shift circuit for a sub-picture screen for Picture-In-Picture feature, comprising:
brightness signal separation means;
brightness level comparison means, coupled to detect character brightness level and width of signals received from said brightness signal separation means;
identical position comparison means coupled to receive a signal representing brightness width from said brightness level comparison means;
timing setting means for setting vertical and horizontal timings of character area based on signals generated by said identical position comparison means;
counting means for counting a number of fields having the vertical and horizontal timings of the character area in said timing setting means set; and
a microcomputer for generating control signals based on a signal generated in said counting means.

9. A device as claimed in claim 8, further comprising:
a Picture-In-Picture processing unit for providing a composite video signal of a main picture screen to said brightness signal separation means; and
an OR gate, coupled to receive automatic and manual shift signals, for providing the automatic and manual shift signals to said microcomputer.

10. A device as claimed in claim 9, wherein said brightness signal separation means comprises:
a low filter, coupled to receive the composite video signal from said Picture-In-Picture processing unit, for removing high frequency components of the composite video signal;
synch signal removal means coupled to receive the filtered composite video signal from said low pass filter for removing a synch signal from said filtered composite video signal producing a brightness signal; and
amplification means coupled to receive the brightness signal from said synch signal removal means for amplifying the brightness signal.

11. A device as claimed in claim 10, wherein said brightness level comparison means is coupled to receive said amplified brightness signal from said brightness signal separation means to compare a previously detected brightness width with a next detected brightness width in order to generate a SET signal if the detected brightness width occupies the same position or a RESET signal if the detected brightness width occupieus a different position.

12. A method for automatically shifting a sub-picture screen for a Picture-In-Picture feature on a television set in accordance with receipt of a character display, comprising the steps of:
checking if the television set is in Picture-In-Picture mode;
setting accurate timings for a specified initial sub-picture screen position if not in Picture-In-Picture mode;
receiving a composite video signal;
separating a low frequency signal from the composite video signal to produce a first signal;
removing synch signals from the first signal producing a second signal;
amplifying the second signal;
checking if character information can be detected;
comparing the amplified second signal to a first reference value if character information is detected;
checking if a brightness width of the amplified second signal is within a first reference range if the amplified second signal is greater than the first reference value;
determining the brightness width and setting horizontal and vertical timing if the brightness width is within the first reference range;
setting and resetting the horizontal and vertical timings until a field has been completed;
counting one vertical sync signal;
comparing the count of the vertical sync signal with a second reference value;
shifting the sub-picture screen to a secondary specified area if the count exceeds the second reference value;
checking if a shift occurred three times in less than five seconds after the first shift;
returning to step of checking for Picture-In-Picture mode if less than three consecutive shifts are detected;
returning the sub-picture screen to initial position if three consecutive shifts are detected; and
delaying for a prescribed time after return of sub-picture screen to initial position.

* * * * *